April 28, 1953  J. NEUFELD  2,636,994
SPECTROMETER
Filed May 5, 1947  5 Sheets-Sheet 1

INVENTOR.
Jacob Neufeld

FIG 16

April 28, 1953  J. NEUFELD  2,636,994
SPECTROMETER
Filed May 5, 1947  5 Sheets-Sheet 3

INVENTOR.
Jacob Neufeld

April 28, 1953

J. NEUFELD 2,636,994

SPECTROMETER

Filed May 5, 1947

INVENTOR.

Jacob Neufeld

Patented Apr. 28, 1953

2,636,994

UNITED STATES PATENT OFFICE 2,636,994

SPECTROMETER

Jacob Neufeld, Tulsa, Okla.

Application May 5, 1947, Serial No. 745,988

17 Claims. (Cl. 250—83.6)

This invention relates to a method and apparatus for spectrographic analysis of various radiations and deals particularly with spectographic analysis of nuclear radiations such as alpha rays, beta rays, and other radiations.

Various objects and advantages of the present invention will be apparent from the description which follows when taken with the drawing in which:

Fig. 1b shows a modification of Fig. 1 comprising a shallow parallel plate ionization chamber.

Figure 1:
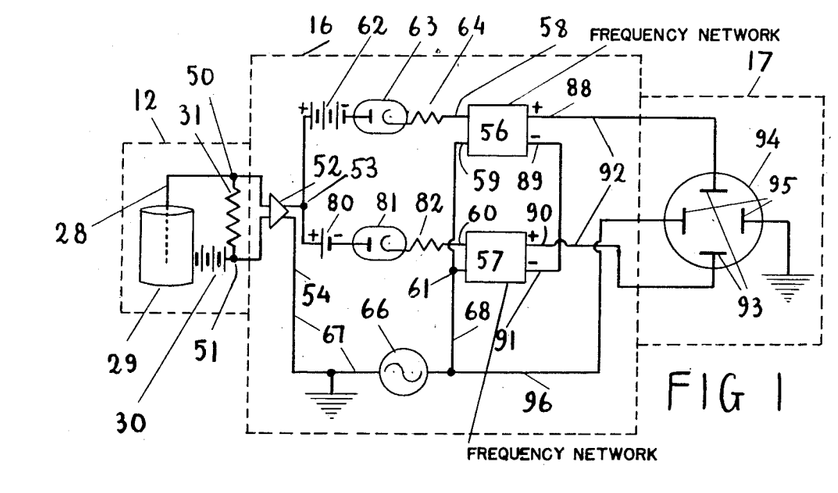
Fig. 1 shows diagrammatically a general arrangement for performing nuclear spectrographic analysis in accordance with this invention, said arrangement utilizing frequency meters.

Referring now more particularly to Fig. 1 numeral 11 designates a source of radiation, of particles such as for instance, alpha or beta particles. These particles are received by a suitable detector 12 positioned in the immediate proximity of said source. The output terminals of the detector 12 are connected to an electrical transducing circuit comprised with a dotted rectangle 16 and adapted to translate the detector output into suitable voltages to be applied to a cathode ray tube comprised within a dotted rectangle 17. The cathode ray tube is adapted to provide a visual representation of the spectral composition of alpha or beta particles radiated by the source 11.

The detector used for the above purpose may consist of an ionization chamber having an anode 28, cathode 29, and an ionizable gas under suitable pressure. A suitable voltage is applied to the electrodes by means of a battery 30 thereby causing an ionization current to flow through the resistor 31 in series with the battery thereby creating across the terminals of the resistor 31 a corresponding voltage. The detector 12 is of a pulse forming type and can be either a pulse ionization chamber or a crystal counter. The pulse ionization chamber has geometrical dimensions that are sufficient to absorb completely within the gaseous medium all incoming beta or alpha particles. The ionization produced by each beta particle produces in the output circuit an impulse which is an unambiguous measure for the energy of the corresponding particle.

Figure 1A:
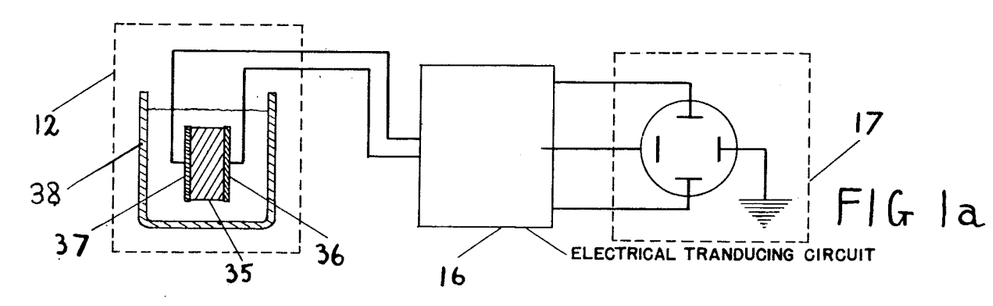
Fig. 1a shows a modified portion of Fig. 1 comprising a crystal counter.

The crystal counter illustrated schematically in Fig. 1a consists of a plate 35 of silver-chloride, two metallic electrodes 36, 37 adjacent to both sides of the silver-chloride plate, the whole assembly being maintained at liquid air temperature within a suitable Dewar vessel 38, the low temperature being necessary in order to eliminate the ionic conductivity of the crystal. The remaining components of the nuclear spectrometer such as the electrical transducer 16 connected to the output of the crystal counter, and the cathode ray tube 17 connected to the output of the transducer 16 are the same in Fig. 1 and Fig. 1a.

Further information about crystal counters can be found in "The Crystal Counter. A New Instrument in Nuclear Physics" by P. J. Van Heerden Amsterdam, N. V. Noord-Hollandsche Unitgevers Maatschapij 1945.

Figure 2:
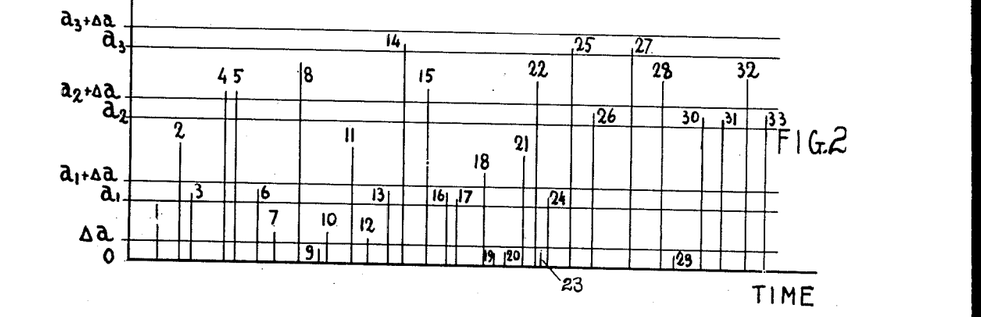
Fig. 2 gives diagrammatically the output of a radiation pulse detector in which the axis of abscissas represent the time of occurrence of the pulses and the ordinates represent their respective magnitudes.

The voltage impulses derived from the output of the detector 12 are substantially of the form designated by numerals 1 to 33 in Fig. 2. They occur in succession one after another in coincidence with the particles traversing the detector 12 and have magnitudes that respectively represent the energies of the corresponding particles.

The principle of the method consists in selecting a determined time interval and considering during said time interval only a portion of impulses derived from the output of the detector 12 and namely impulses that represent a narrow energy range of the incoming particles. Assume that the magnitudes of impulses representing the selected energy range are comprised within limits $a$ and $a+\Delta a$ where $\Delta a$ is a small value. Consequently, only those impulses in Fig. 2 that are larger in magnitude than a value $a$ and smaller than a value $a+\Delta a$ are located within the selected energy range. Let the number of impulses satisfying this condition be $n$. From the inspection of Fig. 2, it is apparent that if $a=0$, then only the impulses 9, 19, 20, 23 and 29 will be larger than $a=0$ and smaller than $\Delta a$. The number of these impulses designated by $n_0$ is 5. If $a$ assumes a value $a_1$ then only the impulses 3, 6, 13, 16, 17, and 24 will be larger than $a_1$ and smaller than $\Delta a + a_1$. The number of these impulses designated by $n_1$ is 6. If $a$ assumes a value $a_2$ then only the impulses 26, 30, 31, and 33 are larger than $a_2$ and smaller than $\Delta a_2$. Consequently, the corresponding number $n_2=4$. If $a$ assumes a value $a_3$ then only the impulses 14, 25, and 27 are larger than $a_3$ and smaller than $\Delta a_3$. Then the number of these impulses designated by $n_3$ is 3.

The above illustration is based upon the assumption that the total number of impulses during the interval of a single measurement of the value $n$ is 33. In actual practice, however, the number of impulses is considerably larger so that in the measurement of various values of $n$ such as $n_0$, $n_1$, $n_2$, $n_3$, etc. the error due to statistical fluctuations can be neglected.

Figure 3:
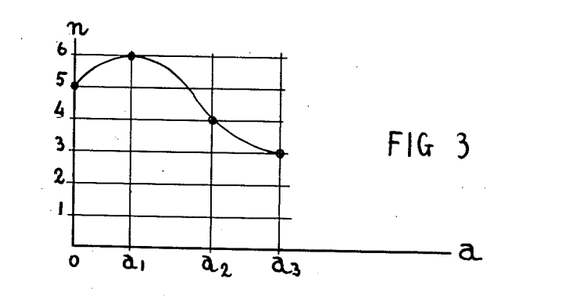
Fig. 3 gives diagrammatically frequency amplitude spectrum obtained by means of the instrument of Fig. 1.

It is apparent from the above that if $a$ is allowed to vary continuously so as to cover continuously all the values from 0 to $a_3$ and if, furthermore, the value $\Delta a$ is maintained constant, then we obtain a continuous range of corresponding values of $n$. If we plot all the values of $a$ along the axis of abscissas and the corresponding value of $n$ along the axis of ordinates we obtain a diagrammatic representation similar to the one of Fig. 3. It is apparent that each abscissa value represents the magnitude of energy $a$ within a range of width $\Delta a$. Consequently, the abscissas are measured in units of energy such as electron volts, frequencies, wave lengths, etc. On the other hand, each value of the ordinate represents the number of impulses per unit of time, said impulses being within the energy range $a$, $a+\Delta a$. Consequently, the diagram of Fig. 3 represents schematically the energy distribution of impulses represented in their time succession by Fig. 2.

In order to obtain the intensity $n_a$ corresponding to any single energy component $a$ (i. e. defining a band limited by the value $a$ and $a+\Delta a$) the following instrumental steps are necessary:

(1) Apply the output of the detector 12 to a channel A that will transmit only those impulses that are larger than $a+\Delta a$ and determine the number $N_1$ of impulses thus transmitted per unit of time.

(2) Simultaneously with the step (1) apply the output of the detector 12 to a channel B that will transmit only those impulses that are larger than $a$ and determine the number $N_2$ of impulses thus transmitted per unit of time.

(3) Subtract the value $N_1$ from the value $N_2$, i. e. determine $n_a = N_2 - N_1$.

It is apparent from the above that since $N_1$ represents the number of impulses per unit of time that are larger than $a+\Delta a$ and $N_2$ represents the number of impulses per unit of time that are larger than $a$ the value $n_a = N_1 - N_2$ represents the number of impulses per unit of time having magnitude comprised with the limits $a$ and $a+\Delta a$.

In order to produce a representation of the spectral distribution of the incoming radiation, the following further instrumental steps are necessary:

(4) Vary continuously the characteristics of the channels A and B so as to scan with the value $a$ a determined range from zero to $a_3$ and determine the corresponding variation of $n_a$.

(5) Produce a trace representing visually the relationship between $n_a$ and $a$.

Consider now again Fig. 1. The voltage impulses derived from the output terminals 50, 51 of the detector 12 are applied through an amplifier 52 having output terminals 53, 54 to the channels A and B. Each channel is characterized by a threshold value and is arranged to transmit only those impulses the magnitude of which exceeds the corresponding threshold value. Furthermore, the threshold values of the channels A and B are arranged to vary sinusoidally with respect to time. Let the threshold value of the channel A vary with time as $0.5a_3(1+\sin wt)+\Delta a$ and the threshold value of the channel B vary with time as $0.5a_3(1+\sin wt)$. Consequently, at any instant $t$ the impulses transmitted through the channel A are larger than $$0.5a_3(1+\sin wt)+\Delta a$$

and the impulses transmitted through the channel B are larger than $0.5a_3(1+\sin wt)$.

The channels A and B connect the output terminals 53, 54 of the amplifier 52 to two frequency responsive networks 56, 57, respectively. In particular, the channel A connects the terminals 50, 51 to the input terminals 58, 59 of the frequency responsive network 56 and the channel B connects the terminals 50, 51 to the input terminals 60, 61 of the frequency responsive network 57.

The channel A comprises a battery 62 in series with a rectifier 63 and resistor 64 interposed between the terminals 53, 58 and a source of alternating voltage 66 interposed between the terminals 54, 59 through leads 67, 68. Let the voltage of the battery 62 be $E_1$ and the voltage of the A. C. source 66 be $E_2 \sin wt$. These two voltages are arranged to oppose the voltage impulses derived from the terminals 53, 54 and their combined value is equal $$E_1 + E_2 \sin wt = 0.5a_3(1+\sin wt)+\Delta a$$

It is apparent that in order to obtain the voltage transmitted through channel A and applied to the output terminals 58, 59 we should subtract from the voltage across the input terminals 53, 54 the sum of the voltages of the A. C. source 66 and the battery 62 and to rectify the obtained difference. Consequently, the channel A has a threshold, and the value of this threshold is determined by the sum of the voltages of the A. C. source 66 and the voltage of the battery 62, i. e. it is equal to $0.5a_3(1+\sin wt)+\Delta a$. Since the value of the A. C. source varies, this threshold voltage is subjected to continual and recurrent variations that is represented by the downward and upward motion of the horizontal line in Fig. 2, the distance of said horizontal line from the axis of abscissa indicating at any instant the value of said threshold. Assume that at the instant under consideration $t_1$ the threshold value $0.5a_3(1+\sin wt)+\Delta a = a_1+\Delta a$. Then only the impulses that are above said threshold value are applied to the output terminals 58, 59, said impulses being 2, 4, 5, 8, 11, 14, 15, 18, 21, 22, 25, 26, 27, 28, 30, 31, 32, and 33. These impulses are transmitted through the terminals 58, 59 to the frequency responsive network 56.

The channel B comprises a battery 80 in series with a rectifier 81 and a resistor 82 interposed between the terminals 53, 60 and the alternating voltage source 66 interposed between the terminals 54, 61 through leads 67, 68. Let the voltage of the battery 80 be $E_3$. Then the combined voltages of the battery 80 and the A. C. source 66 oppose the voltage impulses derived from the terminals 53, 54 and their combined value is equal $E_3 + E_1 \sin wt = 0.5a_3 (1 + \sin wt)$.

It is also apparent that in order to obtain the voltage transmitted through channel B and applied to the output terminals 60, 61 we should subtract from the voltage across the input terminals 53, 54 the sum of the voltages of the A. C. source 66 and the battery 80 and to rectify the obtained difference. Thus the channel B has also a threshold value that is determined by the sum of the voltages of the A. C. source 66 and the voltage of the battery 80. The voltage of the battery 80 is smaller than the voltage of the battery 62 by an amount $\Delta a$ and therefore the threshold of the channel B is represented at any instant by the value $0.5a_3 (1+\sin wt)$. Since the value of the A. C. source varies the threshold voltage of the channel B is also subjected to continual and recurrent variations that are represented by the downward and upward motion of the horizontal line in Fig. 2, said line being always below the line corresponding to channel A by the amount $\Delta a$. Since at the instant $t_1$ under consideration the instantaneous threshold value of the channel B is represented by the line $a_1$ only the impulses above this line such as the ones designated in Fig. 2 by the numerals 2, 3, 4, 5, 6, 8, 11, 13, 14, 15, 16, 17, 18, 21, 22, 24, 25, 26, 27, 28, 30, 31, 32, 33 are transmitted through the channel B and applied to the frequency responsive network 57.

The frequency responsive networks 56, 57 are of standard construction and are adapted to produce across their output terminals 88, 89 and 90, 91, respectively, D. C. voltages. The D. C. voltage derived from the output terminals 88, 89 represents the frequency of impulses applied to the input terminals 58, 59 and the D. C. voltage derived from the output terminals 90, 91 represents the frequency of the impulses applied to the terminals 60, 61.

The outputs of frequency responsive networks 56 and 57 are connected in opposition, i. e., the negative terminal 89 has the same polarity as the negative terminal 91. Consequently, the difference of voltage between the terminals 88 and 90 applied to leads 92 represents the frequency of impulses contained within two limiting values: $0.5a_3 (1+\sin wt) + \Delta a$ and $0.5a_3 (1+\sin wt)$. At the instant $t_1$ under consideration the voltage between the leads 92 represents the intensity of the flux of photons or particles contained between the value $a_1 + \Delta a = 0.5a (1+\sin wt_1) + \Delta a$ and $a_1 = 0.5a_3 (1+\sin wt_1)$. The voltage derived from leads 92 is applied to vertically deflecting plates 93 of a cathode ray oscillograph 94 and deflects the electron beam by an amount representative of the intensity of photon or particle flux between the energy values $a_1 + \Delta a_1$ and $a_1$.

Because of the varying voltage of the A. C. source 66 a scanning process takes place which causes the voltage applied to plates 93 to vary in magnitude and to represent at any instant the frequency of impulses comprised within the value $0.5a_3 (1+\sin wt) + \Delta a$ and $0.5a_3 (1+\sin wt)$. This voltage is applied to the vertically deflecting plates 93 of the cathode ray tube 94. Thus the luminous spot produced by the cathode ray beam is deflected vertically by the amount representing the ordinate of the curve of Fig. 3, i. e., the intensities of the energy component scanned.

The cathode ray tube 93 is provided with horizontally deflecting plates 95, one of said plates being grounded and the other plates being connected through lead 96 to the A. C. source 66 and then to ground.

The voltage of the A. C. source 66 applied to the horizontally deflecting electrodes 95 of the cathode ray tube 93 represents at any instant the threshold value applied to the channels A and B. This voltage also represents energy ranges of individual photons or particles. It is apparent that the voltage applied to the horizontally deflecting plates 95 of the cathode ray tube represents the values of abscissa in the diagram of Fig. 3 since these values correspond to energy or frequency ranges. On the other hand the voltage applied to the vertically deflecting plates 93 of the cathode ray tube represents at any time the number or particles per second, i. e., the intensity of radiation within corresponding energy ranges. Consequently, in the diagrammatic representation of Fig. 3, the voltage applied to the plates 93 represents the values of the ordinates since these values correspond to intensities of various radiation components. During the process of scanning described above, these two voltages vary simultaneously thereby causing the spot produced by the cathode ray tube to produce a curve such as the one shown in Fig. 3 and representing the energy spectrum of the radiation impinging upon the detector 12.

Fig. 1b shows another embodiment of the instrument for producing spectral distribution of heavy ionizing particles. A heavy particle such as alpha particle, proton or a nucleus projected during the disintegration process from a source 150 ionizes the gas between the two conducting plates 151, 152. A voltage V supplied by the battery 153 drives the positive ions upon the collector 152 and hence upon the grid of the first tube 154 of the first amplifying stage 155; after which the ions leak away to the ground. The output of the first amplifier 155 is subjected to further amplification in the linear amplifier 156. The pulse is amplified in such a manner that the output across the terminals 157, 158 is in direct proportion to the ionization produced in the shallow chamber between the electrodes 151, 152 by each incoming particle.

For neutrons we may use in the chamber hydrogen at relatively high pressure or the walls of the chamber may be lined with paraffin, over which a light conducting coat of graphite is used. Various other forms of the detector have been described in "Electron and Nuclear Counters" by S. Korff, B. Van Nostrand Co., New York, N. Y., 1945 (see also "Proposed Neutron Spectrometer in the 10–10,000 Kev. Range" by B. T. Feld, May 17, 1946, distributed by Office of the Publication Board, Dept. of Commerce, Washington, D. C.

Figures 4, 5A, 5B:
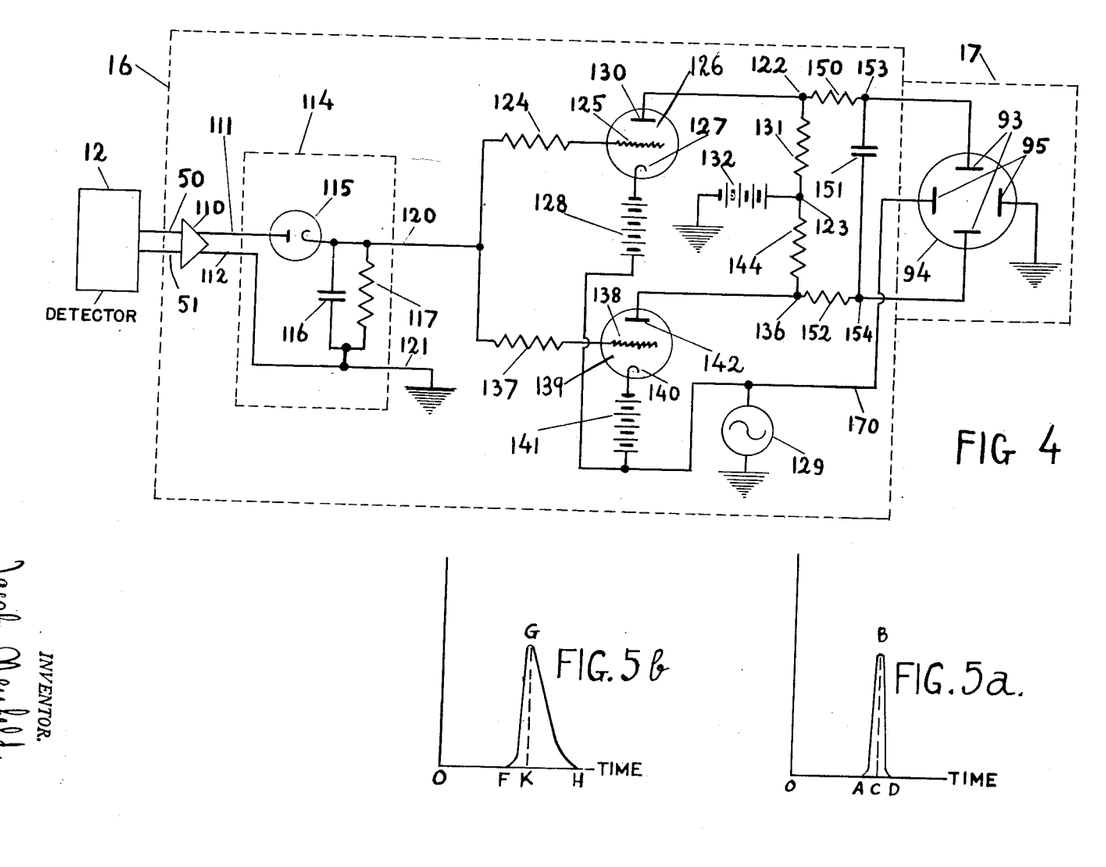
Fig. 4 shows another form of nuclear spectrometer in which frequency measuring circuits have been eliminated.
Figs. 5a, 5b represent diagrammatically the shapes of various impulses utilized in the arrangement of Fig. 4.

Fig. 4 represents another embodiment of a nuclear spectrometer comprising same three components as the nuclear spectrometer of Fig. 1, namely the detector 12, an electrical transducer within the dotted lines 16 and cathode ray tube indicator 17. The detector and the cathode ray indicator are identical in Fig. 1 and Fig. 4. They have been, therefore, designated by the same numerals. The electrical transducer 16 in Fig. 4 is schematically different from the electrical transducer 16 in Fig. 1; it performs, however, the same function to translate the detector output into voltages to be applied to the cathode ray tube for representing visually the spectral distribution of incoming photons or particles.

Consider now more in detail the electrical transducing network 16. It comprises an amplifier 110 connected to the detector 12 and having its output applied to the input terminals 111, 112 of a pulse shaping network 114.

The network 114 consists of a series arm comprising a rectifier 115 and a shunt arm comprising a condenser 116 in parallel with a resistance 117. The type of impulse applied to the input of the network 114 is of shape shown diagrammatically in Fig. 5a in form of a line ABD representing the variation of the magnitude of the impulse with respect to time. The impulse is shown to appear at an instant OA, then rises in accordance with a definite slope until an instant OC at which instant it attains the maximum value CB then it decays and at an instant OD reaches the value zero. Such a voltage impulse is effective to charge suddenly the condenser 116 and to cause the condenser to discharge through the resistance 117. As a result of this we obtain across the output terminals 120, 121 of the network 114 an impulse shown diagrammatically in Fig. 5b. The impulse is shown to appear at the instant OF approximately coinciding with the instant AC, then it rises to its maximum value $KG = CB$ and subsequently decays in accordance with the line GH. Thus the pulse shaping network 114 receives at its input an impulse such as the one of Fig. 5a and produces across the output terminals corresponding impulses shown in Fig. 5b rising to the same height as the input impulse but having a longer time of decay.

The impulses derived from the network 114 are then simultaneously applied to two channels $A_1$ and $B_1$. Each channel is characterized by a threshold value that varies cyclically with respect to time and is arranged to transmit those impulses the magnitude of which exceeds the threshold value. The channel $A_1$ has a threshold value $0.5a_3(1+\sin wt) + \Delta a$ while channel $B_1$ has a threshold value $0.5a_3(1+\sin wt)$ where $\Delta a$ is a relatively small magnitude.

The channel A has input terminals 120, 121 and output terminals 122, 123. The input terminal 120 is connected through the resistor 124 to the grid 125 of a triode 126, said triode having its cathode 127 connected in series with a biasing battery 128 and a source of alternating voltage 129. The voltage source 129 and the input terminal 121 are grounded. The plate 130 of the triode 126 is connected through the output terminal 122, resistor 131 to the output terminal 123 and then through the battery 132 to ground.

The channel B has input terminals 120, 121 and output terminals 123, 136. The input terminal 120 is connected through the resistor 137 to the grid 138 of a triode 139, said triode having its cathode 140 connected in series with a biasing battery 141 and a source of alternating voltage 129. The plate 142 of the triode 139 is connected through the output terminal 136 and the resistor 144 to the output terminal 123 and then through the battery 132 to ground.

It is apparent that we obtain across the output terminals 122, 123 only those impulses that are capable of overcoming the biasing voltage of the tube 126. Assume that the voltage of the battery 128 is $E^1_1$ and the voltage of the A. C. source 129 is $E^1_2 \sin wt$ and that the total biasing voltage $E^1_1 + E^1_2 \sin wt = 0.5a_3(1+\sin wt) + \Delta a$. It is apparent therefore that only the voltage impulses that are capable of exceeding the threshold value $0.5a_3(1+\sin wt) + \Delta a$ are transmitted through the channel $A_1$ and appear across the output terminals 122, 123.

Similarly in the channel B only those voltages appear across the output terminals 136, 123 that are capable of overcoming the biasing voltage of the tube 139. Assume that the voltage of the battery 141 is $E^1_3 = E^1_1 - \Delta a$. Then the total biasing voltage of the tube 139 is $E^1_3 + E^1_2 \sin wt = 0.5a_3(1+\sin wt)$. Consequently, only the impulses that are capable of exceeding the threshold value $0.5a_3(1+\sin wt)$ appear across the terminals 136, 123.

It is apparent that the two output voltages across the terminals 122, 123 and 136, 123 are mounted in opposition, so that the resultant output between the terminals 122, 136 is equal to their difference. Consider now three cases designated as (a) (b) (c).

*Case (a).*—The impulse derived from the terminals 120, 121 has a value below the threshold voltage of the tubes 126 and 139. Consequently, no plate currents will be delivered by these tubes and no voltage will appear across the terminals 122, 136.

*Case (b).*—The impulse derived from the terminals 120, 121 has a value above the threshold voltage of the tubes 126 and 139. Consequently, both tubes deliver plate currents, and two short voltage impulses appear simultaneously across the output terminals 122, 123 and 136, 123. Since these two voltages are equal one to another, the resultant voltage across the terminals 122, 136 is zero.

*Case (c).*—The impulse derived from the terminals 120, 121 has a value larger than the threshold of the tube 139, i. e. larger than $0.5a_3(1+\sin wt)$ and smaller than the threshold of the tube 126, i. e. smaller than $$0.5a_3(1+\sin wt) + \Delta a$$

Consequently, a plate current will pass through the tube 139 and no plate current will pass through the tube 126. Consequently, no voltage will be produced across the terminals 122, 123 and a short voltage impulse will appear across the terminals 136, 123. We obtain, therefore, across the terminals 136, 122 a resultant voltage coincident with the impulse derived from the terminals 120, 121.

It is therefore apparent that at any instant $t$ only those impulses that are comprised within the energy range limited by values $$0.5a_3(1+\sin wt) \text{ and } 0.5a_3(1+\sin wt) + \Delta a$$

produce corresponding output impulses across the terminals 136, 122. These output impulses are in turn applied to a resistor 150 in series with a condenser 151 and in series with a resistor 152. We therefore obtain across the output terminals 153, 154 a voltage that is substantially equal to the number of impulses per second comprised within the energy range limited by values $$0.5a_3(1+\sin wt) \text{ and } 0.5a_3(1+\sin wt) + \Delta a$$

This voltage is in turn applied to the vertically deflecting plates 93 of the cathode ray tube 94.

Because of the varying voltage of the source 129 as the scanning process takes place, the voltage applied to the plates 93 varies in magnitude so as to represent at any instant the frequency of impulses comprised within the values $$0.5a_3(1+\sin wt) + \Delta a \text{ and } 0.5a_3(1+\sin wt)$$

The cathode ray tube 93 is provided with horizontally deflecting plates 95, one said plate being grounded and the other plate being connected through lead 170 to the A. C. source 129 and to ground.

Consequently, the voltage of the A. C. source 129 applied to the horizontally deflecting plates 95 of the cathode ray tube 93 represents at any instant the threshold value applied to the channels A and B. This voltage also represents energy ranges of individual photons or particles. Thus, the voltage applied to the horizontally deflecting plates 95 of the cathode ray tube is represented by the values of abscissa in the diagram of Fig. 3 since said values correspond to energy and frequency ranges. On the other hand, the voltage applied to the vertically deflecting plates 93 of the cathode ray tube 94 represents at any time the number of photons or particles per second, i. e. the intensity of radiation within said energy ranges. This corresponds to the values of ordinates in Fig. 3 since these values represent the intensities of various radiation components.

During the process of scanning described above, these two voltages vary simultaneously thereby causing the spot produced by the cathode ray tube to move along a curve such as the one shown in Fig. 3 representing the energy spectrum of radiation impinging upon the detector 12.

Figure 6:
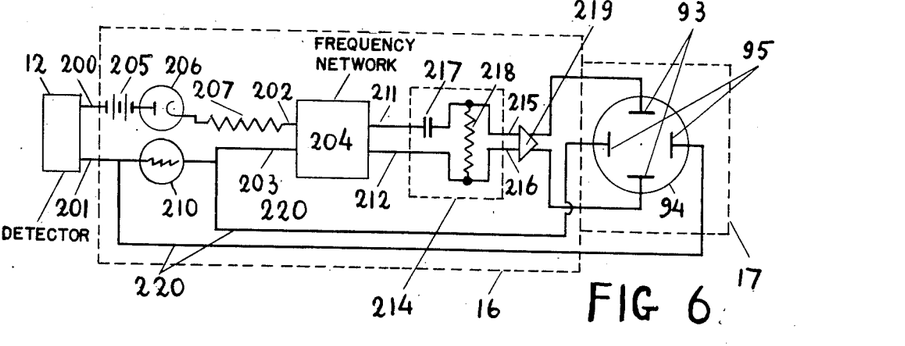
Fig. 6 shows a modified embodiment of a nuclear spectrometer utilizing a derivation circuit.

Fig. 6 represents another embodiment of a nuclear spectrometer comprising the same three components as the nuclear spectrometer of Fig. 1, namely, the detector 12, an electrical transducer within the dotted lines 16 and a cathode ray tube indicator within the dotted lines 17. The detector 12 and the cathode ray tube indicator 17 are identical in Fig. 1 and Fig. 6. They have, therefore, been designated by the same numerals. The electrical transducer 16 in Fig. 6 is schematically different from the electrical transducer 16 in Fig. 1. It performs, however, the same function to translate the detector output into voltages to be applied to the cathode ray tube for representing visually the spectral distribution of incoming photons or particles.

Figure 6A:
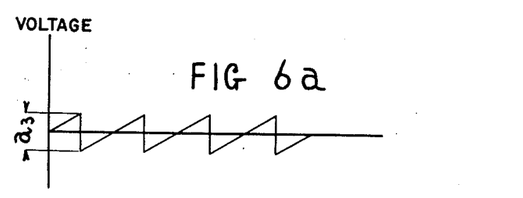
Fig. 6a shows a saw-tooth wave form.

Consider now more in detail the electrical transducing network 16. It comprises a varying threshold channel connecting the output terminals 200, 201 of the detector 12 to the input terminals 202, 203 of a frequency responsive network 204. In particular the varying threshold channel comprises a battery 205 in series with a rectifier 206 and a resistor 207 interposed between the terminals 200, 202 and a voltage source 210 interposed between the terminals 201, 203. The source 210 is of a type well known in the art adapted to generate a saw tooth voltage varying recurrently from a value $-(a_3/2)$ to the value $+(a_3/2)$ in accordance with the diagram shown in Fig. 6a. Let the voltage of the battery 205 be equal to $(a_3/2)$. The battery voltage and the voltage of the source 210 are arranged to oppose the voltage impulses derived from the terminals 200, 201. Let the instantaneous value of the sum of the two voltages be $a(t)$, where $a(t)$ is "sawtooth" wave varying recurrently and linearly from zero to the maximum value $a_3$. At each instant $t$ there is a number $N(t)$ of impulses that exceed the instantaneous threshold value $a(t)$. In this particular case we are interested in the number of impulses $n_a$ which are contained within a narrow range having limits $a$ and $a+\Delta a$. Assume that at an instant $(t+\Delta t)$ the instantaneous threshold value becomes $a+\Delta a$ and the corresponding number of impulses exceeding the new threshold value becomes $N+\Delta N$. It is apparent that $$N_a = (\Delta N/\Delta t) = (dN/da) \quad (1)$$

Since the function $a(t)$ has a sawtooth form, i. e. increases linearly with respect to time, we can write $$N_a = (dN/da) = K(dN/dt) \quad (2)$$

where K is a suitable constant.

Referring now again to Fig. 6 it is seen that at any instant $t$, $N(t)$ impulses are applied to the input terminals of the frequency responsive network 204. We obtain thus across the output terminals 211, 212 of the network 204 a unidirectional voltage having magnitude proportional to $N(t)$. This voltage is in turn applied to a derivator circuit contained within the block 214. The derivator circuit is adapted to perform the process of derivation electrically in such a manner that when it receives between its input terminals 211 and 212 a certain voltage it delivers across its output terminals 215 and 216 another voltage varying substantially as the derivative with respect to time of the input voltage. The derivator 214 consists of a capacitor 217 inserted between the terminals 211 and 215 and of the resistor 218 inserted between the terminals 215 and 216.

It is thus apparent that we obtain across the output terminals 215, 216 of the circuit 214 a voltage proportional to $(dN/dt)$. It is also apparent from the formula given above that this voltage represents the number $n_a$ of photons comprised at the given instant within a very narrow range (having a width $\Delta a$) above the threshold value $a(t)$. This voltage is applied after suitable amplification by means of the amplifier 219 to the vertically deflecting plates 93 of the cathode ray oscillograph 94. The horizontally deflecting plates 95 of the oscillograph are connected by means of leads 220 to the sawtooth wave generator 210. The circuit is provided with conventional blackout arrangement during the beginning of each sawtooth cycle.

It is apparent that we obtain on the screen of the cathode ray tube a diagram representing the spectrum of incoming radiation, substantially similar to the one shown in Fig. 3.

Consider now the derivator 214. Its operation can be explained mathematically as follows:

Let $B_1(t)$ be the function representing the voltage applied across the input terminals 211 and 212 of the derivator 214, $B_2(t)$ the function representing the voltage across the output terminals 215 and 216, $C^1$ the capacitance of the capacitor 217, $R^1$ the resistance of the resistor 218 and $i(t)$ the current flowing through the capacitance 217. Assume also that the output terminals 215 and 216 of the derivator 214 have been disconnected from the amplifier 219. Consequently, the same current $i(t)$ flows through the capacitance 217 and through the resistance 218 and the following relation holds true:

$$B_1(t) = \frac{1}{C^1}\int i(t)dt + R^1 i(t) \quad (3)$$

Differentiating this equation we obtain:

$$\frac{dB_1(t)}{dt} = \frac{1}{C^1}i(t) + R^1\frac{di(t)}{dt} \quad (4)$$

By selecting the proper values of the resistance $R^1$, for example, making $R^1$ negligibly small, the term $R^1 di/dt$ can be made negligible as compared to $i(t)/C^1$ and the following relation may held with an approximation satisfactory for practical purposes:

$$\frac{dB_1(t)}{dt} = \frac{1}{C^1} i(t) \quad (5)$$

Multiplying both sides of the equation by $C^1 R^1$ we obtain:

$$C^1 R^1 \frac{dB_1(t)}{dt} = R^1 i(t) = B_2(t) \quad (6)$$

Consequently, the expression $R^1 i(t)$ which represents the voltage drop across the resistor 218 between the output terminals 215 and 216 is substantially proportional to $dB_1(t)/dt$.

Figure 7A:
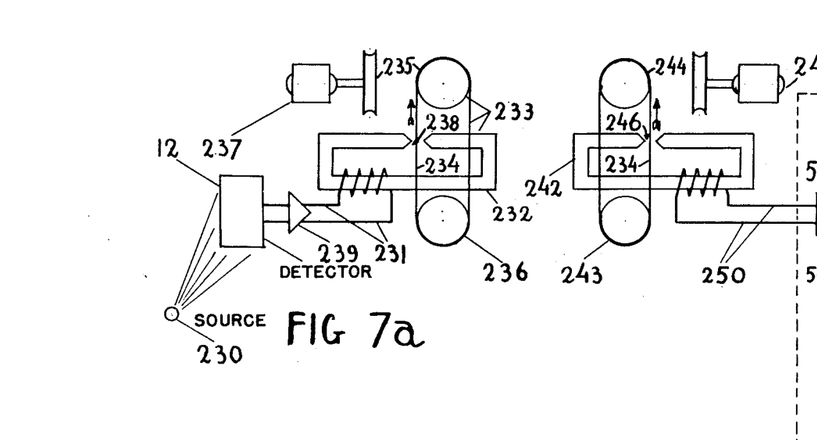
Fig. 7 shows a modified form of nuclear spectrometer adapted for measurements of weak radiations.
Figure 7B:
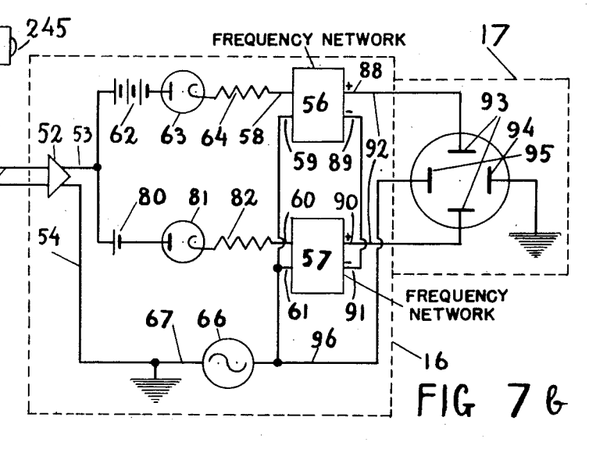

The arrangement is illustrated in Fig. 1 and Fig. 4 is particularly adapted to provide energy distribution of relatively strong radiation in which the time interval for determining the number of counts need not to be excessively long in order to render the random fluctuations negligible. If, however, the time interval necessary for a satisfactory measurement is large it is desirable to use a measuring arrangement as illustrated in Fig. 7a, 7b. The arrangement shown in these figures comprises two components: a recorder illustrated in Fig. 7a and a reproducer illustrated in 7b. The recorder comprises a portion of the elements of Fig. 1 or Fig. 4 such as a detector 12 exposed to a radiation source 230. The source 230 may emit any radiations resulting from nuclear disintegrations such as alpha rays, gamma rays, photons, neutrons, etc. The detector 12 is of an appropriate form depending upon the type of radiation that it is desired to detect. Consequently, the detector 12 may respond to either of said radiations and to produce across the output terminals 231 voltage impulses coincident with incoming photons or particles and having magnitudes representing the energies of said individual photons or particles. The output terminals 231 are applied to a recording head 232 of suitable magnetic recorder 233. The recording head 232 is in operative relation to a magnetic tape 234 that runs upward in the direction indicated by the arrow. Two spools or reels 235, 236 serve as support for the tape and are arranged to be driven by a motor 237.

The recording head 232 consists of an electromagnet having an iron core and a winding wound around the core. The core is provided with two pole pieces immediately adjacent one to another. The pole pieces are provided with sharp edges in form of knife blades in order to localize within a narrow zone of exploration the flux that passes between them. The narrow air gap between the pole pieces is designated by 238. The tape 234 is made to pass through the air gap in such a manner, that the plane of the tape is perpendicular to the line joining the pole pieces and the tape is assumed to be wound upon the spool 236 and the motion of the tape in the direction indicated by the arrow is produced by unwinding the tape from the spool 236 and winding it upon the spool 235.

The electrical impulses derived from the detector 12 after a suitable amplification in the amplifier 239 induce corresponding impulses of magnetic field within the recording head 232, the magnitude of said impulses representing energies of corresponding photons or particles. Therefore, as the tape 234 is moved in the direction of the arrow as described above, it is brought to a very high transverse magnetization by the flux impulse set up in the pole pieces of the recording head. By "transverse magnetization" it is meant that the flux in the tape is in the direction of its thickness. It is also apparent that after this portion of the tape has left the air gap and proceeds in the direction of the arrow towards the spool 235, a subsequent portion of the tape enters the air gap and becomes subsequently magnetized in the direction perpendicular to the tape, and to the extent dependent upon the strength of the succeeding magnetic field impulse in the air gap at said subsequent instant. Because of the magnetic retentivity, each element of the tape, after having passed through the air gap, acquires a magnetic moment which is oriented in the direction perpendicular to the tape.

It is therefore apparent that the tape 234, during its motion in the direction of the arrow becomes wound upon the spool 235, and retains a succession of magnetic moments, the distribution of which with respect to the length of the tape has a relationship to the individual energies and to the time succession of photons or particles traversing the detector 12.

Fig. 7b shows the reproducing components for translating the recordings made upon the magnetic tape 234 into an energy spectrum upon the screen of a cathode ray oscillograph similar to the one described above. The arrangement shown shows a magnetic reproducer. The output of the magnetic reproducer after a suitable amplification is applied to a transducer 16 and then to a cathode ray tube indicator 17. Transducer 16 and the cathode ray tube indicator 17 are identical in Figures 7a, b, and Fig. 1. Therefore, similar elements are designated by the same numerals in Figs. 7a, b, and Fig. 1.

The magnetic reproducer comprises the usual reproducing head 242 associated with the tape 234 at a point between the two spools 243, 244. In order to reproduce the energy impulses of incoming photons or particles impressed magnetically upon the tape 234, the tape has to be moved linearly through the reproducing head 242 in the direction indicated by the arrow. At the initial instant, the magnetized tape containing the record of the impulses is completely wound upon the spool 243, the impressions being reproduced by progressively unwinding the spool 243, whereby the tape 234 is made to move past the reproducing head 242 and becomes progressively wound upon the spool 244. As shown in the figure, the unwinding of the spool 243 and the simultaneous winding of the spool 244 is effected by means of a motor 245.

The reproducer head 242 is structurally similar to the recording head 232. In particular, the reproducer head consists of an electromagnet having an iron core and a winding wound around the core. The core is provided with two pole pieces having a form of two relatively sharp edges and immediately adjacent one to another. The narrow air gap between the pole pieces is designated by 246. The tape 234 is made to pass through the air gap 246 in such a manner that the plane of the tape is perpendicular to the line joining the pole pieces.

It is apparent that the successive portions of the tape containing the magnetic impressions of the energy impulses pass through the air gap 246. In the manner shown, the pole pieces will each supply a convenient magnetic path for the changing flux resulting from the passage of the magnetized tape and cause this flux to pass through the associated coil. This changing flux generates a voltage in the coil. We therefore obtain across the output terminals 250 of the reproducing head a succession of voltage impulses such as shown in Fig. 2, i. e. similar to the voltage impulses that appeared across the output terminals of the detector 12.

The operation of the arrangement of Fig. 7a, b is based therefore upon producing a magnetic record on a suitable tape 234 of the output of the detector 12 and subsequently reproducing the record, thereby deriving the impulses representing the detector output. Using instrumental steps similar to those in Fig. 1 the electric impulses derived from the magnetic reproducer are simultaneously transmitted to channels No. 1 and No. 2 differing one from the other by their threshold value. By providing a suitable scanning with said threshold valves and with the means of the cathode ray tube a graph is produced upon the screen of the tube that represents the energy distribution of the radiations impinging upon the detector. The manner according to which the impulses derived from the magnetic reproducer are utilized to produce the energy distribution in the cathode ray oscillograph has been described in connection with Fig. 1.

In the illustration chosen for Fig. 7b the block 16 translating the output of the reproducer into suitable voltages to be applied to the cathode ray tube 93 is of the same type as block 16 in Fig. 1. It is, however, apparent that we may use in Fig. 7b the arrangement represented by block 16 in Fig. 4 for the purpose of translating the reproduced impulses into suitable voltages to be applied to the cathode ray tube.

The magnetic recording tape 234 shown in Fig. 7a and Fig. 7b forms a closed loop having a certain length L cm. Let the lineal speed of the tape during the recording process be $V_1$ cm./sec. Consequently, the time interval corresponding to one complete revolution of the loop 234 during the recording is $$T_1 = (L/V_1) \text{ second} \quad (7)$$

Assume that the lineal speed of the magnetic tape during the reproducing be $V_2$ cm./sec. Consequently, the time interval corresponding to one complete revolution of the loop during the reproducing is $$^1T_2 = (L/V_2) \text{ second} \quad (8)$$

Two methods shall be considered. In the first one $$V_2 = nV_1 \quad (9)$$

i. e. the lineal speed $V_2$ during the reproduction is $n$ times larger than the lineal speed during the recording. Furthermore, the recording is effected only once during $T_1$ seconds, i. e. during one complete revolution of the loop 234 while the reproducing is effected continually and recurrently with the period of $T_2$ seconds.

It is apparent that in accordance with this method the number of revolutions per minute of the motor 245 is $n$ times larger than the number of revolutions of motor 237. Consequently, the rate at which the current impulses are applied to the transducer 16 in Fig. 7b are $n$ times larger than the rate at which the corresponding energy quanta impinge upon the detector 12 from the source 230. It is apparent therefore that the frequency of impulses in the portion of the instruments of Fig. 7b are $n$ times larger than the frequency of corresponding energy quanta.

Consequently, the impulses applied to the input terminals 250 of the block 16 in Fig. 7b are identical to impulses that would have been obtained from a source $n$ times stronger directly without the use of magnetic recorder-reproducer (by means of the arrangement of Fig. 1 or Fig. 4).

Therefore, in order to obtain the spectral distribution of photons or particles from a weak source two steps are necessary. The first step consists in recording the incoming particles or photons on a suitable tape running at relatively low speed and we may limit the recording time to one complete cycle of the loop 234. The second step consists in reproducing the tape impression while running the tape at a speed $n$ times greater, thus producing results that would have been obtained directly from a source of radiations $n$ times stronger.

The second method differs from the first in that the recording time is equal to $$T_1^1 = nT_1 = n(L/V_1) \text{ second} \quad (10)$$

i. e. the recording time is $n$ times larger than one period of revolution of the loop 234. It is apparent that during each period $T_1$ the loop receives a succession of magnetic impressions that distribute themselves throughout its length in accordance with the time distributions of photons or particles radiated from the source 230. It is noted that the complete recording time comprises $n$ such periods and each period brings its own contribution of magnetic impressions that distribute themselves upon the tape and add to impressions made during the preceding periods. Consequently, the number of impulses impressed upon the tape 234 after the completion of $n$ periods is $n$ times larger than the number of impulses obtained during one period. Consequently, the magnetic impressions obtained on the tape 234 are the same if the source were $n$ times stronger and the recording process were limited one to one period of revolution of the turn. In order to reproduce the signals from the tape 234 it is desirable to run the tape at a speed $V_2$ that is greater than $V_1$ although in this method it is not essential since the disadvantages of using a weak source 230 have been overcome by increasing the recording time $n$ times.

We may synthesize the above consideration as follows: Let $N_1$ represent the number of complete revolutions of the tape 233 during the recording process and $R_1$ the number of impulses per second derived from the detector 12. It is apparent that the number $D$ of magnetic impressions per unit of length of the tape 233 will increase proportionately to $R_1$ and $N_1$ and will decrease proportionately to the linear speed $V_1$ cm./sec. of the tape, i. e.

$$D = \frac{R_1 N_1}{V_1}$$

It is also apparent that the number $R_2$ of impulses reproduced per second from the magnetic tape is proportional to the number $D$ of magnetic impressions per unit of length and to the lineal speed $V_2$ cm./sec. of the tape during the reproduction, i. e.

$$R_2 = D \times V_2 = \frac{N_1 V_2}{V_1} R_1$$

For the satisfactory operation of the instrument it is necessary for $R_2$ to be larger than $R_1$, i. e. the number of impulses per sec. during reproduction should be larger than during recording; consequently $$\frac{N_1 V_2}{V_1} > 1$$

and the speed $V_2$ should be larger than $$\frac{V_1}{N}$$

Figure 7C:
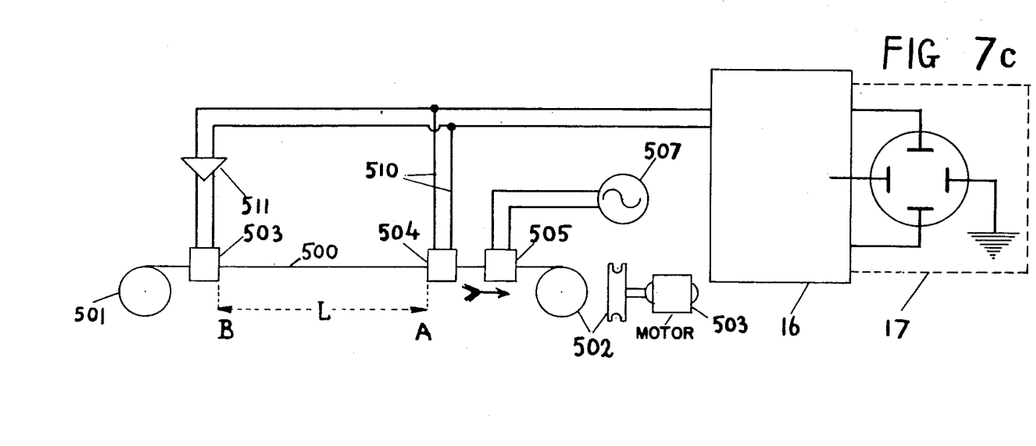

Fig. 7c illustrates a modified embodiment of the invention in which instead of a closed loop 234 we use as a carrier of magnetic impressions a tape 500 the length of which is very great as compared to the value of L cm. The tape is being unwound from the spools 501 to the spool 502 by means of an appropriate motor 503 driving the spool 502 clockwise. The tape moves in the direction of the arrow and passes in proximity of a recording head 503, reproducing head 504 and erasing head 505 suitably displaced one from another. The erasing head is connected to an A. C. source 507.

The portion of the wire between the points A and B contains impressions of magnetic impulses obtained by means of an arrangement similar to the one of Fig. 7a and representing the succession of photons or particles detected by means of the detector 12 and recorded during a suitable time interval $T_1 = (L/V_1)$ sec.

During the reproducing process we obtain across the output terminals 510 of the reproducing head 504 a succession of impulses which are in turn applied to the transducing network 16 and to the cathode ray indicator 17 in the manner hereinabove described. The reproduced impulses derived from the terminals 510 are also amplified in an amplifier 511 and impressed upon the recording head 503 positioned at a distance L from the reproducing head 504. Consequently, the signals reproduced from the tape 500 by means of head 504 are simultaneously impressed upon the tape by means of the head 503. The erasing head 505 has as a purpose of erasing the magnetic impression after they have passed through the head 504.

Consequently, three processes take place simultaneously during the motion of the wire 500. These processes are as follows:

(a) erasing of all the magnetic signals that have passed through the reproducing head 504. Consequently, the portion of the moving tape to the right of the point A is being continually demagnetized.

(b) reproducing of all the signals that pass through the reproducing head 504. These signals transmitted through block 16 produce a visual indication in the indicator 17.

(c) impressing upon the moving wire at the point B of all the signals that are being reproduced.

Consequently, the magnetic signals are being simultaneously erased to the right of the point A and reimpressed at the point B. Therefore, the succession of magnetic impulses is continually and recurrently reimpressed upon the portion of moving tape contained within the points A and B. Accordingly, we obtain in the output of the reproducer head a recurrent succession of magnetic impulses producing the same result as if a closed loop of the length L passed continually and recurrently through the reproducing head 504. Because of the retentivity of the cathode ray screen in the indicator 17 these recurrent impulses produce a presistent visual indication representing the spectral distribution of the impulses recorded upon the tape 500.

I claim:

1. Method of analyzing radiation consisting of individual photons or particles succeeding each other, said photons or particles having different energy values, comprising the step of producing electrical impulses coincident with said photons or particles and having magnitudes representing the respective energies of said photons or particles, selectively receiving a portion of said impulses within a determined range of magnitudes and producing a signal representing said received portion, varying said range and simultaneously producing an indication representing the relationship between said signal and said range.

2. Method of analyzing radiation consisting of individual photons or particles succeeding each other, said photons or particles having different energy values, comprising the step of producing electrical impulses coincident with said photons or particles and having magnitudes representing the respective energies of said photons or particles, selectively receiving a portion of said impulses within a predetermined range of magnitudes, producing a signal representing the number of impulses within said range per unit of time, varying said range and producing an indication representing the functional relationship between said number of impulses and said range.

3. In an instrument for analyzing radiation consisting of individual photons or particles succeeding each other, said photons or particles having different energy values, a detector responsive to said radiation for producing a succession of impulses coincident with said photons or particles and having magnitude representing the respective energies of said photons or particles, a channel connected to said detector and having variable threshold for transmitting impulses exceeding said threshold, a control element for varying the value of said threshold, and an indicator responsive to the output of said channel and operated in accordance with the variation of said threshold for providing an indication of said radiation.

4. In a method of analyzing weak radiations, said radiations consisting of individual particles or photons succeeding each other at a rate that is relatively low, the step of producing individual current impulses coincident with said particles or photons, recording said impulses as they succeed each other upon a suitable tape and simultaneously moving said tape at a relatively low speed, the step of reproducing said impulses from said tape and simultaneously moving said tape at a higher speed, whereby said reproduced impulses succeed each other at a rate correspondingly higher than the rate of said impressed impulses and the step of analyzing said reproduced impulses.

5. In a method of analyzing weak radiations consisting of individual particles or photons succeeding each other at a rate that is relatively low, said particles or photons having different energy values, the step of producing individual current impulses coincident with said particles or photons and having magnitudes representing the respective energies of said particles or photons, recording said impulses as they succeed each other upon a suitable tape and simultaneously moving said tape at a relatively low speed, the step of reproducing said impulses from said tape and simultaneously moving said tape at a higher speed, whereby said reproduced impulses succeed each other at a rate correspondingly higher than the rate of said impressed impulses, selectively receiving a portion of said reproduced impulses within a determined range of magnitude, producing a signal representing the rate of succession of said reproduced impulses within said range, varying said range, and representing a functional relationship between said signal and said range.

6. In an instrument for analyzing radiation consisting of individual photons or particles succeeding each other, said photons or particles have different energy values, a detector responsive to said radiation for producing a succession of impulses coincident with said photons or particles and having magnitudes representing the respective energies of said photons or particles, a channel connected to said detector and means for transmitting impulses within a range of magnitudes, means for varying said range, and an indicator responsive to said impulses and operated in accordance with the variations in said range for providing an indication of said radiation.

7. In an instrument for analyzing radiation consisting of individual photons or particles succeeding each other, said photons or particles having different energy values, a detector responsive to said radiation for producing a succession of impulses coincident with said photons or particles and having magnitudes representing the respective energies of said photons or particles, a movable signal carrier, means for driving said carrier at a certain rate of speed, a recording element connected to said detector for recording said impulses on said carrier while said carrier is driven at a certain rate of speed, means for changing to a new rate of speed at which said carrier is driven, reproducer element for reproducing said recorded impulses while said carrier is driven past said element at said new rate of speed, a channel connected to said reproducer and having a variable parameter for transmitting reproduced impulses within a range of magnitudes determined by said parameter, a control element for varying the value of said parameter, and an indicator responsive to the output of said channel, and operated in accordance with the variation of said parameter for providing an indication of said radiation.

8. In an instrument for measuring radiation consisting of individual photons or particles succeeding each other at a rate that is relatively low, a detector responsive to said radiation for producing a succession of impulses coincident with said photons or particles, a movable signal carrier, means for moving said carrier at a certain rate of speed, a recording element connected to said detector for recording said impulses on said carrier while said carrier is driven at said certain rate of speed, means for changing the speed at which said carrier is moved, reproducer element for reproducing said recorded impulses while said carrier is moved past said reproduced element at said changed speed, whereby the reproduced impulses succeed each other at a rate that is relatively high, and a measuring means connected to said reproducer element.

9. In an instrument for measuring radiation consisting of individual photons or particles succeeding each other at a rate that is relatively low, a detector responsive to said radiation for producing a succession of impulses coincident with said photons or particles, an endless movable signal carrier, a recording element connected to said detector for impressing said impulses on said signal carrier, means for moving said carrier at a certain speed during a time interval sufficient to effect a determined number of cycles in the motion of said carrier, means for imparting to said carrier a suitable speed, a reproducer element for reproducing said recorded impulses while said carrier is driven past said reproducer element at said suitable speed, said suitable speed being determined in such a manner that the rate of reproduced impulses is larger than the rate of incoming impulses, and a measuring element connected to said reproducer element.

10. In an instrument for measuring radiation consisting of individual photons or particles succeeding each other at a rate that is relatively low, a detector responsive to said radiation for producing a succession of impulses coincident with said photons or particles, a signal storage element for receiving and storing said impulses and subsequently reproducing said impulses at a higher rate, and a measuring means connected to said element.

11. In an instrument for analyzing radiation consisting of individual photons or particles succeeding each other at a rate that is relatively low, said photons or particles having different energy values, a detector responsive to said radiation for producing a succession of impulses coincident with said photons or particles and having magitudes representing the respective energies of said photons or particles, a signal storge element for receiving and storing said impulses and subsequently reproducing said impulses at a higher rate, a channel connected to said signal storage element and having a variable parameter for transmitting reproduced impulses within a range of magnitudes determined by said parameter, a control element for varying the value of said parameter, and an indicator responsive to the output of said channel and operated in accordance with the variation of said parameter for providing an indication of said radiation.

12. In an instrument for analyzing radiation consisting of individual photons or particles succeeding each other, said photons or particles having different energy values, a detector responsive to said radiation for producing a succession of impulses coincident with said photons or particles and having magnitudes representing the respective energies of said photons or particles, means responsive to said impulses for producing simultaneously two electrical signals, one of said signals representing a selected range of magnitudes and the other signal representing the number of impulses within said range, and means responsive to said signals for producing an indication representing a relationship therebetween.

13. In an instrument for measuring radiation consisting of individual photons or particles succeeding each other, said photons or particles having different energy values, a detector responsive to said radiation for producing a succession of impulses coincident with said photons or particles and having magnitudes representing the respective energies of said photons or particles, a selective network of variable selectivity adapted to transmit a portion of said impulses within a range of magnitudes determined by said selectivity, and a scanning means responsive to the output of said network for continually and repeatedly scanning the selectivity and for producing an indication showing a relationship between the ouput of said network and said selectivity.

14. In an instrument for analyzing radiation consisting of individual photons or particles succeeding each other, said photons or particles having different energy values, a detector responsive to said radiation for producing a succession of impulses coincident with said photons or particles and having magnitudes representing the respective energies of said photons or particles, a selective network connected to said detector for selectively transmitting a portion of said umpulses within a range of magnitudes determined by the selectivity of said network, and an indicator operated in conjunction with said selective network and responsive to the output of said network for indicating the relationship between said output and said selectivity.

15. In an instrument for measuring radiation consisting of individual photons or particles succeeding each other at a rate that is relatively low, said photons or particles having different energy values, a detector responsive to said radiation for producing a succession of impulses coincident with said photons or particles and having magnitudes representing the respective energies of said photons or particles, a signal storage element for receiving and storing said impulses and subsequently reproducing said impulses at a higher rate, a selective network of variable selectivity adapted to transmit a portion of said reproduced impulses within a range of magnitudes determined by said selectivity, and a scanning means responsive to the output of said network for continually and repeatedly scanning the selectivity and for producing an indication showing the relationship between the output of said network and said selectivity.

16. In an instrument for measuring radiation consisting of photons or particles succeeding each other and having different energy values, a detector responsive to said radiation for producing a succession of impulses coincident with said photons or particles and having magnitudes representing the respective energies of said photons or particles, a movable carrier, means for driving said carrier at a certain rate of speed, a recording element connected to said detector for recording said impulses on said carrier while said carrier is driven at a certain rate of speed, means for changing to a new rate of speed at which said carrier is driven, reproducer element for reproducing said recorded impulses while said carrier is driven past said element at said new rate of speed, a selective network of variable selectivity connected to said reproducer element for transmitting a portion of reproduced impulses within a range of magnitudes determined by said selectivity, another network connected to said selective network for producing a signal representing the rate of occurrence of said transmitted impulses, and a scanning means responsive to the output of said other network for varying the selectivity of said first network and for producing an indication showing relationship between said signal and said selectivity.

17. Apparatus for determining the composition of an unknown substance, comprising a source of neutrons for bombarding a sample of said substance with a stream of neutrons to produce the radiation of particles or photons from said substance having energies related to the character of the elements in the substance and in numbers related to the relative amounts of said elements in said substance, means for converting said particles or photons into electrical signals having amplitudes representing the respective corresponding energies of said particles or photons, means for measuring the number of said signals having amplitudes within a predetermined range, and means for shifting the amplitude range within which said signals are measured without substantially changing the width of said amplitude range.

JACOB NEUFELD.

References Cited in the file of this patent

UNITED STATES PATENTS

| Number | Name | Date |
|---|---|---|
| 2,289,926 | Neufeld | July 14, 1942 |
| 2,296,176 | Neufeld | Sept. 15, 1942 |
| 2,303,688 | Fearon | Dec. 1, 1942 |
| 2,331,189 | Hipple | Oct. 5, 1943 |
| 2,337,306 | Barnes | Dec. 21, 1943 |
| 2,378,389 | Begun | Jan. 19, 1945 |
| 2,424,218 | Begun | July 22, 1947 |
| 2,469,460 | Fearon | May 10, 1949 |
| 2,508,772 | Pontecorvo | May 23, 1950 |

OTHER REFERENCES

The Interval Selector, Roberts—Rev. of Sci. Instruments, February 1941, vol 12, pp. 71–76.

Roberts—Review of Scientific Instruments, January 1940, pp. 44–45, vol. 11.

Korff—Electron and Nuclear Counters, D. Van Nostrand, Inc., New York, April 1946, pp. 196–197, pp. 18, 19.